Sept. 4, 1928.

F. J. LUKENS

HIGH SPEED TRACKWAY

Filed Oct. 7, 1927

1,682,974

Inventor
Francis J. Lukens,
By Hugh M. Sterling
Attorney

Patented Sept. 4, 1928.

1,682,974

UNITED STATES PATENT OFFICE.

FRANCIS J. LUKENS, OF WASHINGTON, DISTRICT OF COLUMBIA.

HIGH-SPEED TRACKWAY.

Application filed October 7, 1927. Serial No. 224,599.

This invention relates to improvements in railways of the type in which the rails cooperate with parts carried by the vehicle to run thereon so that the vehicle is locked against derailment.

In the present instance it is the object of the invention to apply the above general principle of cooperation to provide a high speed track for motor driven pneumatic tired vehicles, such as automobiles and auto trucks, that will permit safe transportation at high speed over a trackway of relatively low cost of construction and maintenance by reason of the absence of ordinary track wear and the lighter character of construction due to the need for carrying only light loads at greatly increased speed.

A further object of the invention is to make provision whereby the rubber tires of the vehicle will not coact directly with guard portions of the track to guide the vehicle and maintain it on the track, but keep the wheels at all times free of any wearing contact except at the tread thereof, and, further, in case of deflation of a tire occurring to transfer the weight to a guide wheel which will temporarily function to prevent the running on a flattened tire.

The invention consists in certain novel features in the construction and the arrangement of parts, all as hereinafter described and as specifically set forth in the appended claims.

Figure 1:
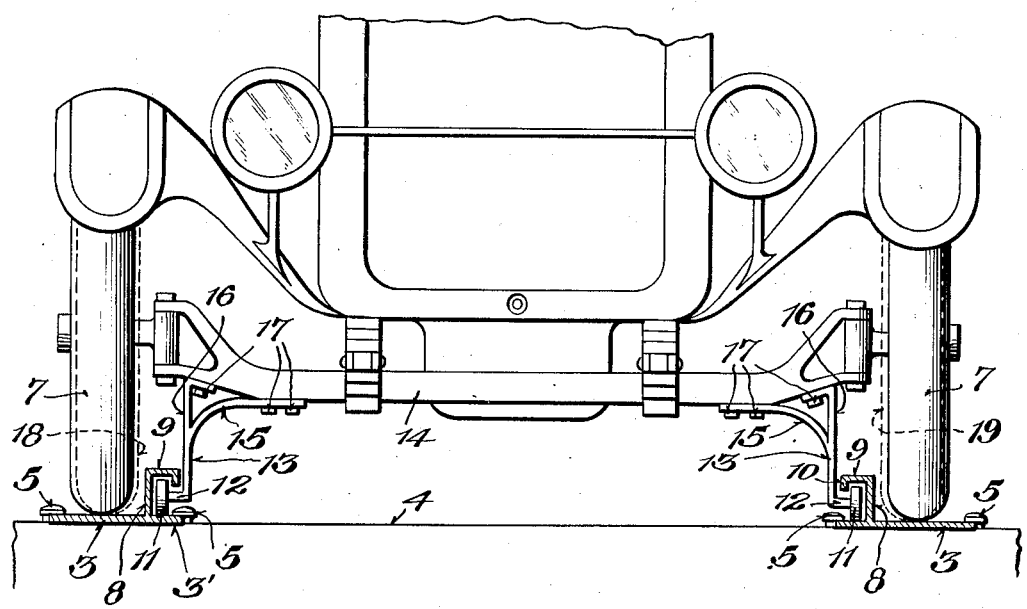
Figure 2:
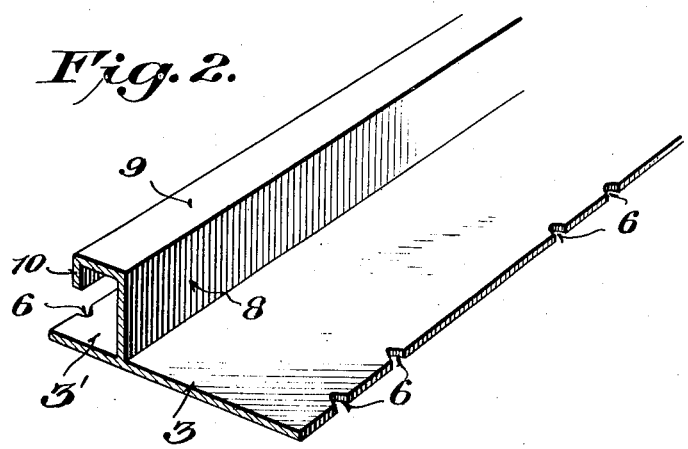

In the accompanying drawings,

Figure 1 is a view in front elevation showing the usual construction of axle, steering knuckle and wheels of an automobile, the wheels being in operative engagement with the track in accordance with the invention, and Figure 2 is a perspective view of a section of track.

Referring to the drawings, the special form of track employed is of comparatively light construction and consists of a broad base portion 3 to rest upon ties 4 by being fastened thereto by spikes 5 in notches 6, and this base furnishes a flat surface for the vehicle wheels 7, which, as shown, are pneumatic rubber tire wheels.

Along the intermargin of the track is formed an upstanding longitudinally running rib or web 8 having bent over at its top to form an inwardly projecting flat portion the overhanging part 9 which runs parallel to the base 3 and which is further bent downwardly along a marginal portion thereof to form the depending part 10 perpendicular to the base. As constituted of the parts 8, 9 and 10, together with the marginal portion 3' of the rail base, a guide and keeper is formed to receive and retain the wheel 11, which is mounted upon a stub shaft 12 carried by a depending arm 13 and rigidly secured thereby to the axle 14 through the branch arms 15 and 16 and the bolts 17, and any further steering rods in other directions may be added as desired.

The wheel 11 is designed to run upon the base portion 3' of the track, to be spaced slightly from the overhanging portion 9, and also to be free to have lateral movement back and forth between the part 8 and the depending part 10, with which it is designed to contact to limit the movement of the vehicle wheels 7, so that under every condition of travel their lateral shifting will be within the dotted lines 18 and 19 indicating the extreme of lateral movement in both directions to prevent contact of the vehicle wheels with any part of the track except the flat base.

The movement of the wheels of the vehicle up and down due to their resiliency and any bounding action of these wheels is provided for in the play of the wheels 11 between its rim and the track part 9, so that the important riding qualities of the pneumatic tire are present notwithstanding the locking of the vehicle against derailment.

The guard wheel 11 may be introduced into the guide way at the rail ends or at convenient points where protected openings may be made, or various expedients may be employed for removing the guide wheel from its stub shaft and thus allow the vehicle to be free to depart from the track.

It will be obvious that by means of the invention the guiding of the vehicle upon the track will be entirely automatic and thus enable the higher rates of speed to be made with greater degree of safety, while these track ways can be built where it will be impracticable to build roads, and they need not be confined to the easy grades of roadways.

What I claim is:

1. In combination, a wheeled vehicle having a depending support carrying a guide wheel, and a track having a base portion to receive the vehicle wheel and guide wheel, and having a guide way for the guide wheel adapted to engage the said wheel on each side thereof to limit its lateral movement.

2. In combination, a wheeled vehicle having a depending support carrying a guide wheel, and a track having a base portion to receive the vehicle wheel and the guide wheel, said base portion having an upstanding longitudinally extending web separating the base into the two-wheel travel portions, and having a portion to overhang the guide wheel and a depending portion to form a side engaging stop for the guide wheel.

3. In combination, a wheeled vehicle having a depending support carrying a guide wheel, and a track having a base portion to receive the vehicle wheel and the guide wheel, and having a portion forming a keeper slot for the guide wheel adapted to have its top and side walls normally spaced apart from the guide wheel to permit lateral movement thereof.

In testimony whereof I affix my signature.

FRANCIS J. LUKENS.